United States Patent [19]

Taylor

[11] 4,202,956

[45] May 13, 1980

[54] THIXOTROPIC ISOCYANATE-TERMINATED PREPOLYMERS AND USE IN THE PREPARATION OF POLYURETHANE COATING COMPOSITIONS

[75] Inventor: James D. Taylor, Flat Rock, Mich.

[73] Assignee: BASF Wyandotte Corporation, Wyandotte, Mich.

[21] Appl. No.: 959,675

[22] Filed: Nov. 13, 1978

[51] Int. Cl.² ............... C08G 18/63; C08G 18/14; B32B 5/20
[52] U.S. Cl. ............... 528/75; 521/138; 428/310; 560/26; 260/33.4 R; 260/33.4 UR
[58] Field of Search ............... 528/75; 560/26; 260/33.4 R

[56] References Cited

U.S. PATENT DOCUMENTS

| | | | |
|---|---|---|---|
| 3,823,201 | 7/1974 | Pizzini et al. | 260/861 |
| 4,021,383 | 5/1977 | Cuscurida et al. | 528/75 |
| 4,021,384 | 5/1977 | Brader et al. | 528/75 |
| 4,093,573 | 6/1978 | Ramlow et al. | 260/2.5 BE |

*Primary Examiner*—H. S. Cockeram
*Attorney, Agent, or Firm*—Joseph D. Michaels

[57] ABSTRACT

Liquid thixotropic isocyanate-terminated prepolymers are prepared by the reaction of a polyarylene polyalkylene polyisocyanate or diphenylmethane diisocyanate with certain graft polyols. The resulting prepolymers are particularly useful in the preparation of polyurethane coating compositions.

8 Claims, No Drawings

THIXOTROPIC ISOCYANATE-TERMINATED PREPOLYMERS AND USE IN THE PREPARATION OF POLYURETHANE COATING COMPOSITIONS

BACKGROUND OF THE INVENTION

1. Field of the Invention

The present invention relates to thixotropic isocyanate-terminated prepolymers. More particularly, the invention relates to prepolymers prepared from certain graft polyols containing unsaturation and certain organic polyisocyanates.

2. Prior Art

The preparation of isocyanate-terminated prepolymers from organic polyisocyanates and polyols is well known in the art. In addition, U.S. Pat. No. Re. 29,014 teaches that graft polyols containing unsaturation can be reacted with organic polyisocyanates to obtain prepolymers for use in the preparation of polyurethane compositions. This patent does not teach the reaction of any specific graft polyol with any specific organic polyisocyanate to prepare an isocyanate-terminated prepolymer.

The use of isocyanate-terminated prepolymers in the preparation of urethane coating compositions is also well known in the art. Normally, however, thixotropic agents must be added to the compositions to achieve nondripping characteristics. The present invention is based on the finding that a select group of reactants results in prepolymer compositions which are thixotropic and thus find special utility in the preparation of polyurethane coating compositions.

SUMMARY OF THE INVENTION

The present invention relates to thixotropic isocyanate-terminated prepolymers having a free isocyanate content of from 15% to 40% by weight, said prepolymers prepared by the reaction of (a) a polyarylene polyalkylene polyisocyanate or diphenylmethane diisocyanate with (b) a graft polyol prepared by the in situ polymerization in the presence of a free radical catalyst of from 10% to 30% by weight of a mixture of from 55% to 75% by weight of styrene and from 45% to 25% by weight of acrylonitrile in from 90% to 70% by weight of a polyol containing from 0.05 mole to 3.0 moles of unsaturation per mole of polyol. The resulting prepolymers are particularly useful in making foams for carpet backing and as ingredients in polyurethane coating compositions.

DESCRIPTION OF THE PREFERRED EMBODIMENTS

In accordance with the subject invention certain graft polyols are employed in the preparation of thixotropic isocyanate-terminated prepolymers having particular utility as ingredients in the preparation of polyurethane coating compositions. The graft polyols which may be employed in the subject invention are prepared from a polyol containing unsaturation and from certain blends of acrylonitrile and styrene.

The unsaturated polyols which may be employed in the present invention may be prepared by the reaction of any conventional polyol with an organic compound having both ethylenic unsaturation and a hydroxyl, carboxyl, anhydride, or epoxy group or they may be prepared by employing an organic compound having both ethylenic unsaturation and a hydroxyl, carboxyl, anhydride, or epoxy group as a reactant in the preparation of the polyol. Representative of such organic compounds include unsaturated mono- and polycarboxylic acids and anhydrides such as maleic acid and anhydride, fumaric acid and anhydride, crotonic acid and anhydride, propenyl succinic anhydride, and halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexane-3,4-epoxide, butadiene monoxide, vinyl glycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is then necessary to react the unsaturated polyol with an alkylene oxide preferably ethylene or propylene oxide, to replace the carboxyl groups with hydroxyl groups prior to employment in the present invention. The amount of alkylene oxide employed is such to reduce the acid number of the unsaturated polyol to about one or less.

To prepare the unsaturated polyols of use in the present invention, from about 0.05 mole to about 3.0 moles, preferably from 0.30 mole to 1.50 moles, of said organic compound per mole of polyol is employed. The preparation of the unsaturated polyols employed in the present invention follows conventional prior art procedures such as disclosed in U.S. Pat. Nos. 3,275,606 and 3,280,077. Generally, this requires a reaction at a temperature between 0° C. and 130° C. Both acidic catalysts, such as Lewis acid catalysts and basic catalysts such as alkali metal hydroxides, may be used. In addition, a noncatalyzed reaction may be used employing temperatures between 50° C. and 200° C.

The polyols which may be employed in the preparation of the unsaturated polyols are well known in the art. They are often prepared by the catalytic condensation of an alkylene oxide or combination of alkylene oxides either simultaneously or sequentially with an organic compound having at least two active hydrogen atoms such as evidenced by U.S. Pat. Nos. 1,922,459; 3,190,927, and 3,346,557.

Representative polyols include polyhydroxyl-containing polyesters, polyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one -SH group and one -OH group as well as those which contain an amino group and a -SH group may be used. Generally, the equivalent weight of the polyols will vary from 100 to 10,000, preferably from 1000 to 3000.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene polyether glycols, polypropylene polyether glycols, and polybutylene polyether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components using a diamine such as ethylenediamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,4-diaminotoluene; aliphatic amines such as methylamine, triisopropanolamine, ethylenediamine, 1,2-propylenediamine, 1,2-butylenediamine.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542.

As mentioned above, the graft polyols of use in the invention are prepared from a mixture of acrylonitrile and styrene. The mixture must comprise from 55% to 75% by weight of styrene and from 45% to 25% by weight of acrylonitrile, said weight percents being based on the total weight of the mixture. As demonstrated hereinafter, amounts of either monomer greater or less than recited are not operable in the subject invention. The total amount of monomers employed in the preparation of the graft polyols is generally from 10% to 30% by weight based on the weight of the graft polyol dispersion.

The preparation of the graft polyols is well documented in the prior art and in particular in U.S. Pat. No. Re. 29,014. In general, the preparation occurs at temperatures between about 80° C. and 170° C. in the presence of a free radical catalyst by blending the catalyst and a portion of the polyol to form a homogeneous stream and simultaneously adding at a steady rate this stream along with a stream of the monomers to a reactor containing the remaining portion of the polyol. Further details of the preparation of the graft polyols can be found in the aforementioned Reissue Patent and in the examples which follow.

In the preparation of the prepolymers of the subject invention, the above described graft polyols are reacted with a polyarylene polyalkylene polyisocyanate or diphenylmethane diisocyanate. In a preferred embodiment of the invention, the graft polyol is first reacted with toluene diisocyanate and thereafter reacted with a polyarylene polyalkylene polyisocyanate. The resulting prepolymers have a free isocyanate content of about 15% to 40% by weight preferably from 20% to 25% by weight.

Any suitable polyarylene polyalkylene polyisocyanate and preferably a polyphenylene polymethylene polyisocyanate which contains both di- and triisocyanates may be used. Mixtures of isocyanates such as those disclosed in U.S. Pat. No. 2,683,730, British Pat. No. 874,430, and Canadian Pat. No. 665,495 are suitable. It is also possible to use mixtures of polyphenylene polymethylene polyisocyanates which are outside the scope of these patents. A particularly desirable one has a viscosity of from about 150 to about 250 cps. at 25° C., and an isocyanate content of at least about 31% and has from about 42% to about 48% of its isocyanate content present as a monomeric diphenyl methane diisocyanate. It is preferred to prepare the polyarylene polyalkylene polyisocyanate by the reaction between aniline and formaldehyde in such proportions of these two reactants that an amine product is obtained which has from about 40% to about 60% of diphenylmethane diamine and the balance higher polyamines so that when the resulting mixture of diphenylmethane diamine and higher polyphenylene polymethylene polyamines is phosgenated, the product contains from about 40% to about 60% diphenyl methane diisocyanate, 20% to 30% triisocyanates, 8% to 17% tetraisocyanate and 5% to 30% penta- or higher polyisocyanates.

The prepolymers of the subject invention are prepared by reacting the graft polyols with the polyisocyanate either in one stage or in a multi-staged process. The reactions are generally conducted at a temperature between 25° C. and 80° C. for a period of between one to four hours depending on the temperature, reactivity of the reactants and other conventionally known reaction conditions. On completion of the reaction, the reaction mixture is cooled to 25° C.

In a particularly preferred embodiment of the subject invention, the resulting isocyanate-terminated prepolymers are employed along with other ingredients in the preparation of polyurethane coating compositions and in particular in the preparation of polyurethane paints. Use of these prepolymers obviates the need for the inclusion of other thixotropic agents to the coating composition.

amount of monomers was twenty weight percent of the graft polyol. All preparations were conducted in the presence of azobis(isobutyronitrile) as free radical catalyst at a temperature of 120° C. In each preparation, a stream of monomers and a stream of catalyst in polyol were fed into a static mixer and continuously added to the reactor containing polyol over a period of three hours. Upon completion of the addition, the reaction mixture was maintained at 120° C. for ½ hour and stripped at 120° C. under less than five millimeters of mercury pressure. The products were liquid polyol dispersions. Additional specifics of the preparations are presented in Table I below.

B. Preparation of Isocyanate-Terminated Prepolymers

A series of prepolymers was prepared from the graft polyols described in A above by reacting the polyols first with TDI and then with a mixture of TDI and PAPI. The prepolymers were prepared by heating the polyol and TDI to 65° C.-70° C. over a period of 1.5 to 2.0 hours. Thereafter, while cooling to room temperature, the mixture of isocyanates was added to yield prepolymers having a free isocyanate content of 24.3 percent (theoretical). Upon cooling to room temperature, a Brookfield viscosity reading was taken of the prepolymer. The prepolymer was stirred for thirty seconds when a viscosity reading was again taken. Details of the preparations are presented in Table I below.

Table 1

| Graft Polyol | A | B | C | D | E | F | G |
|---|---|---|---|---|---|---|---|
| % Styrene | 65 | 60 | 55 | 45 | 35 | 25 | 100 |
| % Acrylonitrile | 35 | 40 | 45 | 55 | 65 | 75 | 0 |
| Prepolymer made from graft polyol, parts | 115 | 115 | 112 | 108 | 118 | 115 | 110 |
| First addition, TDI, parts | 92.4 | 92.4 | 90.0 | 86.8 | 94.8 | 92.4 | 88.0 |
| Second addition, TDI, parts | 26.0 | 26.0 | 25.2 | 24.4 | 26.6 | 26.0 | 24.8 |
| PAPI, parts | 26.0 | 26.0 | 25.2 | 24.4 | 26.6 | 26.0 | 24.8 |
| Viscosity at 24° C., cps | | | | | | | |
| initial | >164,000 | >164,000 | >8,200 | 380 | 300 | 300 | 550 |
| final, 30 seconds later | 7,600 | 3,500 | 5,200 | 360 | 300 | 300 | 410 |
| Thixotropic | yes | yes | yes | no | no | no | no |

In the Examples, the following abbreviations are used and all parts are by weight unless otherwise indicated.

Polyol I—a polyol containing 0.3 mole of unsaturation and having a hydroxyl number of 33 and an oxyethylene content of 15% by weight prepared by capping with ethylene oxide a propylene oxide/allylglycidyl ether heteric adduct of a mixture of glycerine and propylene glycol.

Polyol II—a polyol containing 0.3 mole of unsaturation and having a hydroxyl number of 40 and an oxyethylene content of 9% by weight prepared by first reacting a propylene oxide adduct of glycerine with ethylene oxide and thereafter reacting with a mixture of propylene oxide and allylglycidyl ether.

MDI—diphenylmethane diisocyanate.

PAPI—polyphenylene polymethylene polyisocyanate (functionality of 2.3).

TDI—toluene diisocyanate (80/20 weight mixture of 2,4- and 2,6-isomers).

EXAMPLE I

A. Preparation of Graft Polyols A-G

A series of graft polyols was prepared in a reaction vessel equipped with a thermometer, stirrer, nitrogen source, inlet means and heat exchange means. In each case, Polyol I was employed along with various mixtures of styrene and acrylonitrile. In each case, the total

EXAMPLE II

Following the procedure described in Example I, a thixotropic prepolymer was prepared by reacting (a) 110 parts of a graft polyol having a hydroxyl number of 40 prepared from Polyol II and a mixture of 60 weight percent styrene and 40 weight percent acrylonitrile said mixture being 20 weight percent of the graft polyol with (b) 88.4 parts of TDI followed by a blend of 24.8 parts of TDI and 24.8 parts of PAPI. The resulting prepolymer recorded an initial viscosity of >164,000 cps at 25° C. and a final viscosity of 5800 cps.

This Example was duplicated employing as the graft polyol a product prepared from Polyol II and a mixture of 50 weight percent styrene and 50 weight percent acrylonitrile said mixture being 20 weight percent of the graft polyol. The resulting prepolymer was not thixotropic and recorded initial and final viscosities of 1450 and 1420 cps. Again, the example was duplicated employing as the graft polyol, a product prepared from Polyol II and a mixture of 60 weight percent acrylonitrile and 40 weight percent styrene said mixture being 30 weight percent of the graft polyol. The resulting prepolymer was not thixotropic and recorded initial and final viscosities of 470 and 485 cps.

EXAMPLES III–VII

A series of prepolymers was prepared employing various graft polyols and organic polyisocyanates. In certain preparations, a one step polyisocyanate addition was carried out. All preparations were carried out as described in Example I unless otherwise noted. Details of the preparations are presented in Table II below.

Table II

| Example | III | IV | V | VI | VII |
| --- | --- | --- | --- | --- | --- |
| Graft Polyol, parts | B, 100 | B, 100 | Ex. IV,* 50 | B, 100 | B, 165 |
| PAPI, parts | 365 | — | 26.9 | — | 25.2 |
| TDI, parts | — | 109.5 | — | — | 86.8 |
| MDI, parts | — | — | — | 283 | — |
| % free NCO (theoretical) | 24.3 | 23.8 | 24.3 | 24.3 | 30.1 |
| Viscosity, cps. | | | | | |
| initial | 7000 | 1690 | 55000 | 2200 | 33000 |
| final, 30 seconds later | 3700 | 1690 | 3360 | 360 | 5700 |
| Thixotropic | yes | no | yes | yes | yes |

*Prepolymer prepared in Example IV.

The embodiments of the invention in which an exclusive property or privilege is claimed are defined as follows:

1. Liquid thixotropic isocyanate-terminated prepolymers prepared by the reaction of (a) a polyarylene polyalkylene polyisocyanate or diphenylmethane diisocyanate with (b) a graft polyol prepared by the in situ polymerization in the presence of a free radical catalyst of from 10 percent to 30 percent by weight of a mixture of from 55 percent to 75 percent by weight of styrene and from 45 percent to 25 percent by weight of acrylonitrile in from 90 percent to 70 percent by weight of a polyol containing from 0.05 mole to 3.0 moles of unsaturation per mole of polyol.

2. The prepolymers of claim 1 wherein the graft polyol (b) is first reacted with toluene diisocyanate.

3. The prepolymers of claim 1 wherein the polyol is prepared by the reaction of allylglycidyl ether, propylene oxide and ethylene oxide with a polyhydric alcohol, said allylglycidyl ether being employed in amounts such that the polyol contains from 0.30 mole to 1.50 moles of unsaturation per mole of polyol.

4. The prepolymers of claim 1 wherein (a) is polyphenylene polymethylene polyisocyanate.

5. A process for the preparation of thixotropic isocyanate-terminated prepolymers comprising reacting (a) a polyarylene polyalkylene polyisocyanate or diphenylmethane diisocyanate with (b) a graft polyol prepared by the in situ polymerization in the presence of a free radical catalyst of from 10 percent to 30 percent by weight of a mixture of from 55 percent to 75 percent by weight of styrene and from 45 percent to 25 percent by weight of acrylonitrile in from 90 percent to 70 percent by weight of a polyol containing from 0.05 mole to 3.0 moles of unsaturation per mole of polyol.

6. A process for the preparation of thixotropic isocyanate-terminated prepolymers comprising reacting a graft polyol prepared by the in situ polymerization in the presence of a free radical catalyst of from 10 percent to 30 percent by weight of a mixture of from 55 percent to 75 percent by weight of styrene and from 45 percent to 25 percent by weight of acrylonitrile in from 90 percent to 70 percent by weight of a polyol containing from 0.05 mole to 3.0 moles of unsaturation per mole of polyol with toluene diisocyanate and thereafter adding a polyarylene polyalkylene polyisocyanate thereto.

7. The process of claim 5 or 6 wherein the polyisocyanate is polyphenylene polymethylene polyisocyanate.

8. The process of claim 5 or 6 wherein the polyol is prepared by the reaction of allylglycidyl ether, propylene oxide and ethylene oxide with a polyhydric alcohol, said allylglycidyl ether being employed in amounts such that the polyol contains from 0.30 mole to 1.50 moles of unsaturation per mole of polyol.

* * * * *